May 27, 1952 — H. A. ENDRES — 2,597,927
RUBBER HYDROCHLORIDE AIR FILTER
Filed March 29, 1950
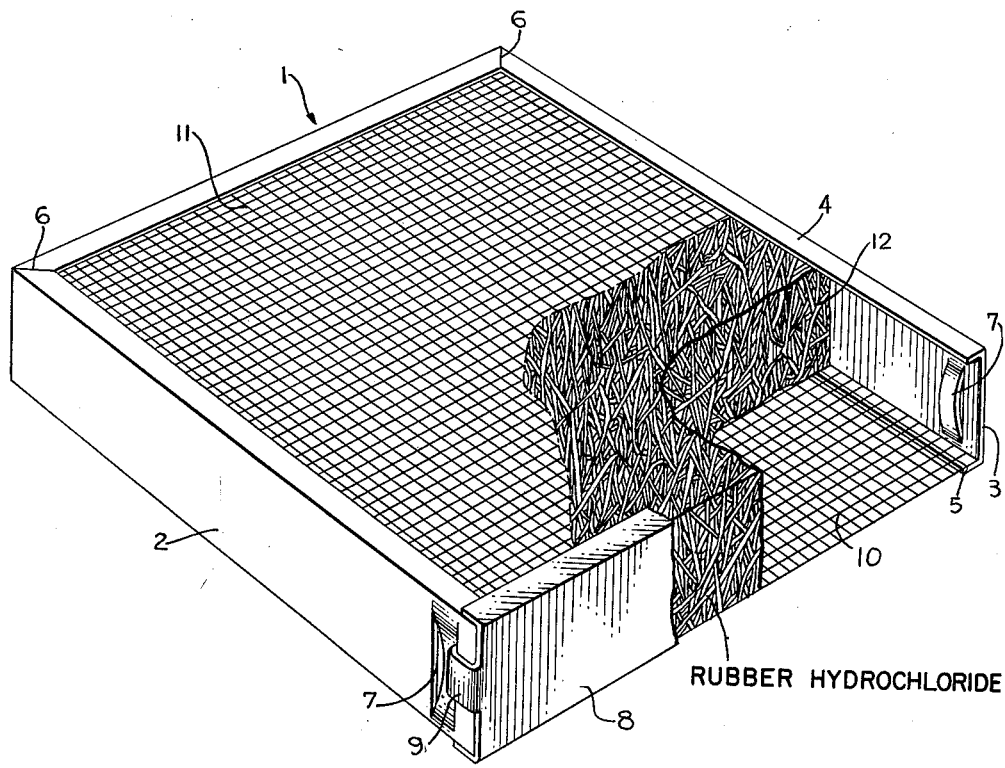
INVENTOR.
Herbert A. Endres
BY
R. L. Miller
ATTORNEY Patented May 27, 1952

2,597,927

UNITED STATES PATENT OFFICE 2,597,927

RUBBER HYDROCHLORIDE AIR FILTER

Herbert A. Endres, Cuyahoga Falls, Ohio, assignor to Wingfoot Corporation, Akron, Ohio, a corporation of Delaware Application March 29, 1950, Serial No. 152,666

6 Claims. (Cl. 183—45)

This invention relates to filters for the removal of particles of foreign matter from gases.

A major problem in conditioning air for various uses resides in the economical and efficient removal of foreign matter present in the atmosphere. This foreign matter may be that which is normally present in the atmosphere and which is desirable to remove as a step in conditioning the air for use in a home, a hotel or similar living accommodation where the presence of such foreign matter is injurious to human health or to walls, drapes, floor coverings, furniture and the like, or in a shop, factory or laboratory where it is desirable to work under dust-free conditions. It may also be desirable to remove from the atmosphere foreign matter not normally present therein, as for example in manufacturing operations involving the presence of paint fumes and similarly finely divided materials.

A well-known method of conditioning air by removing particles of foreign matter therefrom is in the use of an impingement type of filter comprising a supporting medium of steel wool, mineral wool, excelsior or glass fibers coated with an adhesive such as petroleum oil, tricresyl phosphate, or ethylene glycol. The gas is conditioned by forcing it through a mat of the supporting material and the particles of foreign matter are removed from the gas should they impinge upon the adhesive. The effectiveness of an impingement type of filter depends upon the opportunity a dust particle has to strike a surface containing the adhesive. It is not practical to expose too much surface per unit volume to the gas to be conditioned, because the energy consumed in forcing the gas past these surfaces would be too great. An optimum pressure drop for filters of the impingement type has been developed and used by the industry.

However, these filters do not effectively remove the fine particles of foreign matter having a particle size range of that of carbon black, and as a consequence substantially all foreign matter in the small particle size range gets through the filter, and it is these small particles that cause walls, drapes, floor coverings and furniture to become dirty and require cleaning in one way or another. If all or a great percentage of this fine foreign matter could be removed from the air, the walls, drapes, floor coverings and furniture in a room so conditioned would not need to be cleaned of this sort of dirt, which is the primary cause for cleaning.

In addition to being ineffective in removing the fine particles of foreign matter from the air, the impingement type of filter also has a tendency to contaminate the air passed therethrough because of the removal of a portion of the adhesive carried by the supporting material through evaporation or physical disengagement therefrom. It has also been reported that in filters of the glass fiber variety, small strands of the glass fiber have a tendency to become free and thus pass into the air stream and on into the room being conditioned.

Another important disadvantage possessed by the impingement type of filter is the fact that they are not reusable in an efficient and economical manner. If an attempt is made to clean this type of filter with a detergent, the adhesive is removed from the fiber glass along with the impinged dirt particles. In this condition the filter is practically useless as a filter. Before the filter can be restored to its original filtering ability, it is necessary to recoat the fiber glass with an adhesive. This is an expensive and time-consuming operation and one that is not readily done by the user.

A more efficient means that may be used in removing foreign matter from gases is the electrical precipitator. However, these precipitators are prohibitively expensive for many uses, particularly for conditioning air in homes. They are expensive because of their initial cost and because of their upkeep.

There has now been discovered a means for removing fine particles of foreign matter from gases which is substantially as efficient as the electrical precipitator but approaches the cost of the impingement type of filter. The filter medium of this invention comprises rubber hydrochloride arranged to expose a large number of surfaces to a gas directed over these surfaces.

An embodiment of the present invention is shown in the drawing, where a perspective view with parts broken away shows one form of a filter employing ribbons of rubber hydrochloride as the filter medium.

In the drawing, the filter indicated generally at 1 comprises a frame 2 made of any suitable material such as cardboard, steel, aluminum and the like shaped to form a channel section having a side 3 joining the sides 4 and 5, each disposed at right angles to the side 3. The frame may be fabricated from a strip of aluminum by cutting out the necessary material in order to form the corners 6, then having a portion of the material turned up to form the sides 4 and 5, and then pressing out a portion of the side 3 to form a catch 7 to receive the closing side 8 of the frame through the latch member 9. The side 8 is a channel section similar to the frame 2 which is held in place as shown. Disposed within the sides 4 and 5 are two screens 10 and 11 having any suitable mesh opening, preferably about ¼", between which screens is placed the rubber hydrochloride 12 shredded into ribbons of various widths and lengths and arranged to present a porous mat through which the contaminated gas is passed in order to bring the gas into contact with surfaces of the rubber hydrochloride.

It is desirable in using rubber hydrochloride as a filter medium to arrange the rubber hydrochloride in such a way as to expose a great many surfaces thereof to the gas passed therethrough so that the gas will come in contact repeatedly with surfaces of rubber hydrochloride. The rubber hydrochloride may be arranged in this manner by shredding or cutting rubber hydrochloride film into flat ribbons of any particular length, and of a width ranging from 1/64 of an inch and less to ⅛ of an inch, and ranging in thickness from 0.00075 of an inch to 0.0025 of an inch. Generally the ratio of the width to the thickness of a ribbon of rubber hydrochloride will vary from 5 to 1, to 100 to 1.

The invention has been shown in the preferred form; that is, the rubber hydrochloride has been shown in the form of flat ribbons. However, the rubber hydrochloride may be used in other forms. For example, instead of cutting a flat sheet of rubber hydrochloride into ribbons, filaments or fibers of convenient cross section may be used. Rubber hydrochloride in tubular form may also be used. Another form in which the rubber hydrochloride may be used is that in which a sheet of rubber hydrochloride is lacerated by forming a series of parallel slits of any convenient length, for example, 6". Intermittent areas of laceration are made throughout the length of rubber hydrochloride film, which lacerated film is then folded into a convenient frame until the desired thickness is attained. It is desirable in making these lacerations to cut the film in such a way as to form a fine ragged edge. These ragged edges will then function to mechanically hold particles attempting to pass through the slits or lacerations in the film. Particles of rubber hydrochloride, either spherical or of an irregular shape, may also be used, since the rubber hydrochloride in this form permits repeated contact of the gas with rubber hydrochloride surfaces when the gas is passed through a mass of these particles.

When an air filter using rubber hydrochloride is made as shown in the drawing and used in combination with a conventional impingement type of filter in an air conditioning system, an unexpected filtering phenomenon is observed. Illustrating this are the following tests. A rubber hydrochloride filter was made in accordance with the description of the filter shown in the drawing, in which a frame 20" x 20" was made and provided on one side with a screen having ¼" square openings. Ribbons of rubber hydrochloride of various lengths, an average width of 1/32" and 0.002" thick, were sprinkled onto the screen evenly to a depth of 1". This mat of ribbons was held in place with a second screen having ¼" square openings and secured to the frame opposite to the first screen all as shown in the drawing.

In the first test a commercial filter of fiber glass coated with tricresyl phosphate and being 20" x 20" x 1" in size was placed on top of the rubber hydrochloride filter and the two filters were inserted in an air stream so that the air stream passed first through the commercial filter and then through the rubber hydrochloride filter. After 786 hours of service in an "Atlas" Fadeometer machine, which requires the use of filtered air, these filters were removed and inspected. The commercial filter was dirty and discolored. The rubber hydrochloride filter was also dirty and discolored, showing the presence of a considerable amount of fine particles of foreign matter which had been removed from the air that had first passed through the commercial filter.

A second test was run using the same type of filters but this time the rubber hydrochloride filter was positioned on top of the commercial filter and the two filters then inserted into the air stream in such a manner that the air first passed through the rubber hydrochloride filter and then through the commercial filter. After 786 hours of service, in the same machine under conditions identical to the conditions used in the first test, the filters were removed and inspected. The rubber hydrochloride filter was dirty and discolored, but the surprising thing was that the commercial filter was substantially the same color as it was when it was first placed in use and as free from visual dirt as it was when it was first inserted into the air stream.

In attempting to explain this unexpected result, it was observed that the rubber hydrochloride possessed an ability to develop an electrostatic charge on its surface and that this electrostatic charge was produced when a gas was caused to pass over a surface of rubber hydrochloride. Thus, the remarkable efficiency of the filter of this invention appears to be due to the fact that the rubber hydrochloride used in these filters is capable of developing an electrostatic charge sufficient to attract fine particles of foreign matter contained in a gas, and that the rubber hydrochloride is shaped and arranged in such a manner as to permit repeated contact of the gas with rubber hydrochloride. By actual measurement it is found that rubber hydrochloride will develop an electrostatic charge of 1280 volts per 1.5 square inches of surface when air is passed over a rubber hydrochloride surface at a velocity of up to 1200 feet per minute.

It was also observed that the filters of this invention become electrostatically charged upon the first passage of air thereover and retain the foreign matter collected until the foreign matter is removed in some convenient manner, as by cleaning with a detergent and water. It was also observed that an electrostatic charge is developed by the action of cutting a film of rubber hydrochloride into ribbons. The filters of this invention are not sensitive to moisture and function equally well with dry gases as they do with gases having a high moisture vapor content.

For the purposes of this invention, the rubber hydrochloride is the reaction product between natural rubber and hydrogen chloride carried to completion to form a product which may be formed into a self-sustaining film and as more particularly described in Patents Nos. 2,139,647; 2,161,454; 2,259,352; 2,259,355; and 2,274,150.

The rubber hydrochloride is characterized by the fact that it can be formed into films and filaments and yield oriented products on application of stress, referred to as "cold drawing".

It has been found that the oriented or tensilized rubber hydrochloride is more efficient in the removal of dust particles than is the untensilized product. However, both work effectively.

The following example shows a comparison of the efficiency of a filter medium of the present invention and a commercially available filter medium of the impingement type. In the examples all parts are by weight unless otherwise identified.

Example 1

A filtration cell was made by filling a container 4 inches in diameter and 2 inches high with a quantity of glass fibers coated with tricresyl phosphate as the adhesive. Another filter cell was made by filling a container 4 inches in diameter and 2 inches high with shredded tensilized rubber hydrochloride. The rubber hydrochloride had an average width of $\frac{1}{32}$ of an inch. The filtering material was loosely packed in the container and enough used to produce a loose mat of rubber hydrochloride through which the air could be easily passed. The gas entrance side and the gas exit side of the containers were each fitted with a metal screen having ½ inch square openings to keep the filter material in place. The filter containing coated glass fibers was placed in an air stream having a velocity of 300 feet per minute. A quantity of 3.1212 parts of super-spectra carbon black having an average particle size of 0.013 microns was then dispersed in the air stream by means of a duster over a period of 30 minutes. A quantity of 0.2598 parts of the carbon black was collected. Thus, the coated fiber filter medium had an efficiency of 8.3%.

The filter containing shredded tensilized rubber hydrochloride was inserted in the air stream having a velocity of 300 feet per minute. A quantity of 3.1233 parts of the same carbon black was dispersed in the air stream over a period of 30 minutes and 2.1559 parts was collected, indicating an efficiency of 69.00%.

The following example shows the manner in which the filter of this invention using untensilized rubber hydrochloride functions.

Example 2

The conditions of Example 1 were repeated with the exception that untensilized rubber hydrochloride was used in place of the tensilized material. A quantity of 1.6072 gram of carbon black was removed from the air stream into which was dispersed 3.3526 grams of carbon black. The filter was 47.9% efficient.

Example 3

A commercial filter (20" x 20" x 1") containing glass fibers coated with tricresyl phosphate was used in this test and modified by removing ½ of the filter medium or an area 10" x 20" x 1", and replacing it with shredded rubber hydrochloride having an average ribbon width of $\frac{1}{32}$ of an inch. The ribbons of rubber hydrochloride were loosely packed into the frame of the filter and enough used to produce a loose mat of rubber hydrochloride through which the air could be easily passed. This filter was placed in service in a forced draft air circulating system operating on air in the vicinity of The Goodyear Tire & Rubber Company, Akron, Ohio. After being in service continuously for 1188 hours, the filter was removed and examined. It was observed that the glass fiber section of the filter was almost completely choked up with particles of foreign matter on the air entrance side and practically free of foreign matter on the air exit side of the filter.

It was further observed that substantially all of the foreign matter on the air entrance side of the glass fiber section of the filter was confined to the surface with very little foreign matter to be found $\frac{1}{16}$ of an inch into the depth of the filter.

The rubber hydrochloride section of the filter was not choked with foreign matter on the air entrance side of the filter and it was observed that the foreign matter had been substantially equally distributed throughout the thickness of the mass of rubber hydrochloride. This type of distribution of the dust permits greater quantities of dust to be collected and lessens the tendency for the filter to clog. This function is not observed for the impingement type of filter.

It was further observed that the pressure drop on the rubber hydrochloride section of the filter was substantially the same at the end of the test as it was at the beginning of the test, whereas the pressure drop for the glass fiber section of the filter gradually increased constantly throughout its time of use.

Each section of the filter was removed and washed separately in equal volumes of water containing the same detergent. The washings were strained to remove pieces of glass and rubber hydrochloride fibers and then placed in bottles to observe the nature of the suspended foreign matter. The foreign matter from the rubber hydrochloride filter had a blacker appearance than that obtained from the glass fiber section of the filter. Sedimentation tests on these suspensions showed that the rubber hydrochloride had removed a large amount of colloidal carbon from the air which was almost entirely absent in the washings from the glass fiber section of the filter. After settling for one month, the washings from the glass fiber settled out almost completely, leaving a clear supernatant liquid above the sediment, while the washings from the rubber hydrochloride section of the filter were still black.

The following example shows the effectiveness of the filter of this invention in removing tobacco smoke from the air.

Example 4

A smoke generator was used consisting of a glass tube of a length and diameter to receive 10 normal sized cigarettes and placed end to end so that the combustion zone would pass from one cigarette to the next in the direction of the air stream. The end cigarette on the air entrance side of the tube was then ignited and air was drawn through the tube at a constant rate. The smoke-filled air leaving the air exit side of the tube was passed through a piece of rubber tubing to an empty chamber having an exhaust nozzle made of a $\frac{1}{16}$ inch bore glass tubing 30 inches long. The smoke leaving the exhaust nozzle of the empty chamber was of a typical blue color and possessed a characteristic smoke odor. The chamber was then filled with glass fibers coated with tricresyl phosphate taken from a commercial air filter and the smoke-filled air passed through the exhaust nozzle. No change in the color or odor of the smoke was observed in comparison to the color and odor observed in the test using the empty chamber. The glass fiber filter was then replaced with shredded tensilized rubber hydrochloride of the type used in Example 1 and the smoke-filled air passed therethrough, and it was observed that the blue color of the smoke disappeared and the odor was much less pronounced, indicating that the solids present in the smoke were being removed by the rubber hydrochloride filter medium. To obtain a measurement of the amount of material being retained by the filter, the smoke emitted from the nozzle was passed through a cloth disc for 30 seconds and the residue weighed after drying to remove moisture. The results were as follows:

| Filter Medium | Weight of Residue | Percent Retention |
|---|---|---|
| None | 0.0202 | 0 |
| Coated glass fiber | 0.0445 | None |
| Rubber Hydrochloride | 0.0012 | 94.5 |

Substantially the same results were obtained using untensilized rubber hydrochloride.

The following example shows in a different manner the relative efficiency of the filter of this invention in comparison with an impingement type of filter.

*Example 5*

A commercial filter (size 20" x 20" x 1") comprising glass fibers coated with tricresyl phosphate was superimposed on a rubber hydrochloride filter of the same size and placed in an air circulating system in such a manner that the air first passed through the glass fiber filter and then through the rubber hydrochloride filter. After being in service continuously for 786 hours, the filters were examined. The surface of the glass fiber filter was clogged with particles of foreign matter and the glass fibers beyond the surface layer were substantially clean. The rubber hydrochloride filter was uniformly coated with black soot throughout the thickness of the filter. This soot had passed through the glass fiber filter. Foreign matter retained by the glass fiber filter was examined and was made up primarily of larger particles of dust and lint.

The same test was repeated with the exception that the filters were reversed and the air passed through the rubber hydrochloride first, and then through the glass fiber filter. After being in service for 786 hours, the filters were examined and the rubber hydrochloride filter was uniformly coated with black soot throughout its thickness and the glass fiber filter from all appearances was substantially as free from foreign matter as it was when it was first put into use.

While certain representative embodiments and details have been shown for the purpose of illustrating the invention, it will be apparent to those skilled in this art that various changes and modifications may be made therein without departing from the spirit or scope of the invention.

I claim:

1. A gas filter removing suspended particles of matter from a gas, which filter comprises rubber hydrochloride elements arranged to form a gas pervious mat of sufficient thickness to permit multiple contact with the rubber hydrochloride elements of the particles of matter carried by the gas.

2. A gas filter according to claim 1 in which the rubber hydrochloride elements are distributed in random arrangement.

3. A gas filter according to claim 2 in which the rubber hydrochloride elements are in solid form.

4. A gas filter according to claim 3 in which the rubber hydrochloride elements are in the form of ribbons.

5. A gas filter according to claim 4 in which the ribbons of rubber hydrochloride have a ragged edge capable of mechanically holding particles of matter coming in contact therewith.

6. A gas filter according to claim 3 in which the rubber hydrochloride elements are in the form of filaments.

HERBERT A. ENDRES.

REFERENCES CITED

The following references are of record in the file of this patent:

UNITED STATES PATENTS

| Number | Name | Date |
|---|---|---|
| 1,663,298 | Greer et al. | Mar. 20, 1928 |
| 2,324,838 | Hartz et al. | July 20, 1943 |
| 2,347,031 | Cupery | Apr. 18, 1944 |
| 2,355,822 | Rugeley | Aug. 15, 1944 |

FOREIGN PATENTS

| Number | Country | Date |
|---|---|---|
| 492,956 | Great Britain | Sept. 26, 1938 |